Oct. 27, 1959     R. J. BINEGAR     2,910,105
TIRE TRACTION DEVICE
Filed April 1, 1957
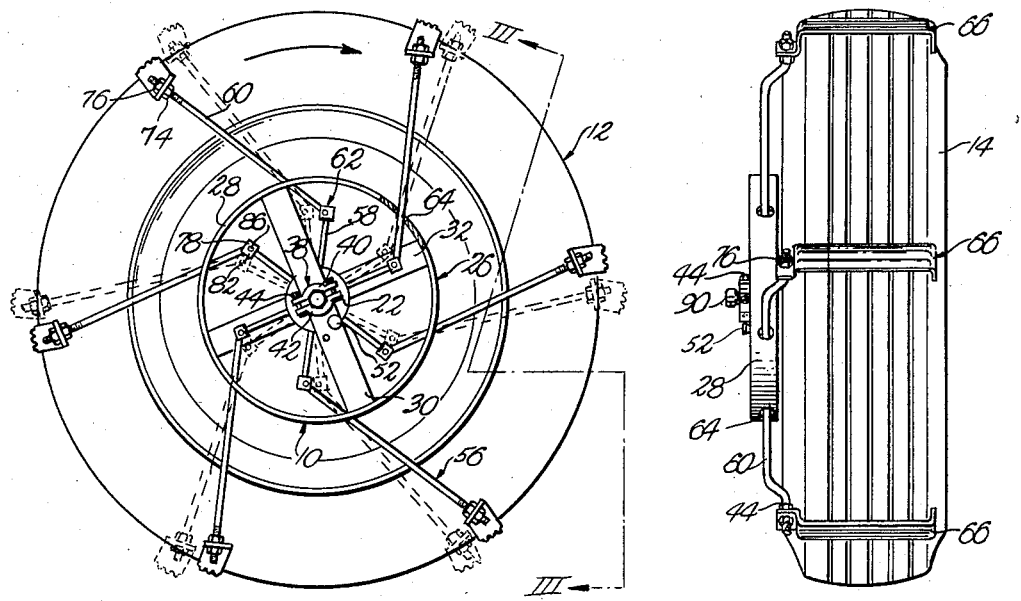
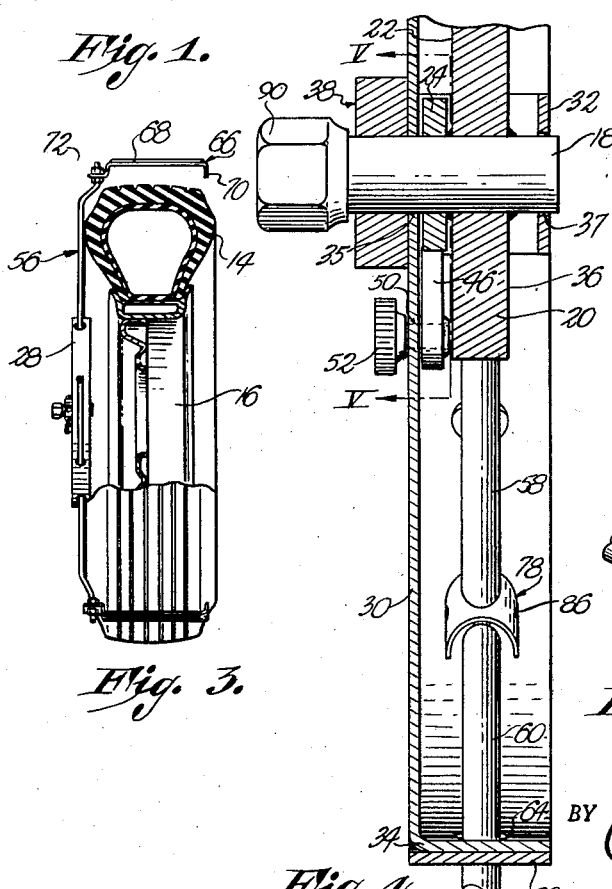
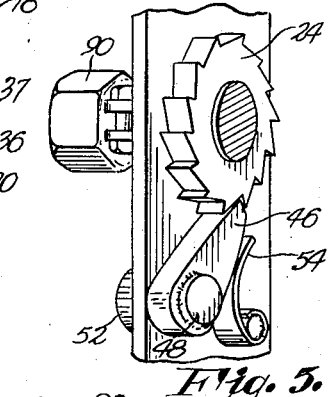
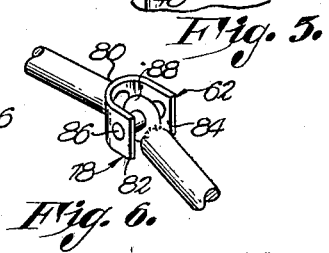
INVENTOR.
Rollin J. Binegar
BY
ATTORNEY

United States Patent Office 2,910,105
Patented Oct. 27, 1959

2,910,105

TIRE TRACTION DEVICE

Rollin J. Binegar, Kansas City, Mo.

Application April 1, 1957, Serial No. 649,918

6 Claims. (Cl. 152—225)

This invention relates to tire traction devices and, more particularly, to a readily mountable and demountable traction assembly which is adapted to be mounted on a vehicle tire in a short time and with a minimum of effort.

Although a great number of vehicle tire traction mechanisms have been known and practiced for a long time, such devices have not been completely satisfactory for many reasons including the fact that, in most instances, it is extremely difficult to place the traction device on the vehicle tire and, also, such devices are known to break down quickly under heavy work loads and continuous use. The most successful of the previously known traction devices have been of the type wherein it is necessary to first raise the tire or wheel of the vehicle off the ground and then place the chain or similar structure around the tire, securing means being provided on both sides of the tire. Manifestly, although this type of structure is, for the most part, successful, it obviously is extremely inconvenient to use, consumes a long period of time and necessitates, in many instances, getting underneath portions of the vehicle in order to install or remove the same.

Therefore, it is the most important object of this invention to provide a readily mountable and demountable traction device which may be placed in position on a vehicle tire without the necessity of raising the tire off the ground or in any manner reaching behind the tire to secure a joinder assembly at the inner portion thereof.

A further important object of this invention is to provide a tire traction device having the desired properties wherein there is provided a plurality of articulated arms having tire grips on the outermost ends thereof and adapted to be brought into engagement with the tread of the tire by turning of a single shaft to which the arms are attached, thereby permitting the tire traction assembly to be placed on a vehicle tire by rotation of a single shaft.

An equally important object of this invention is to provide a tire traction device as set forth above wherein there is provided an annular fulcruming element surrounding the shaft and which reciprocably receives a segment of the arms so that, upon rotation of the shaft to which the arms are attached, each of the segments of the arms is fulcrumed against the annular element so as to cause the tire grips on the outermost ends of the arms to move inwardly into engagement with the tire.

An additional important object of this invention is to provide a tire traction device as described which has a novel ratchet assembly connected to the shaft for preventing retrograde movement of the shaft after the tire grips have been tightened in position against the tread of the tire.

Other important objects relate to the provision of a pawl which is biased into engagement with the teeth of the ratchet as referred to above, so as to prevent retrograde movement of the shaft, the pawl being connected to a rotatable knob so that the ratchet may be quickly and readily released to thereby allow removal of the tire traction assembly on a tire in a very short interval of time and with a minimum of effort; to the provision of outwardly extending legs on both faces of the U-shaped tire grips, so that the grip firmly engages the tread of the tire and there is also provided an extremely high coefficient of friction between the grip and the ground; to the provision of means on the end of the shaft for receiving a standard tire tool so that the tire traction device may be quickly placed on a tire with readily available tools; to the provision of a unique joint for joining the two sections of the arms to which the tire grips are attached, whereby all road shocks and centrifugal force will not in any manner tend to cause the traction assembly to become dislodged from the tire; to the provision of an overall assembly which may be delivered to the consumer at a practical unit price; and other objects and details of construction which will become obvious as the following specification progresses.

In the drawing:

Figure 1 is a fragmentary, side elevational view showing a tire traction device made in accordance with the concepts of the instant invention mounted on a tire, the extended position of the various components of the device being shown in phantom to illustrate the manner in which the device is removed from the tire;

Fig. 2 is an end elevational view of the device shown in Fig. 1;

Fig. 3 is a reduced, partial cross-sectional view taken on the irregular line III—III of Fig. 1;

Fig. 4 is an enlarged, fragmentary, central, cross-sectional view taken through the shaft of the tire traction device;

Fig. 5 is an enlarged, fragmentary, perspective view taken on the line V—V of Fig. 4, certain parts being in section; and Fig. 6 is an enlarged, fragmentary, perspective view illustrating the joint connecting the two sections of the outwardly extending arms forming a part of the tire traction device.

A tire traction device broadly designated by the numeral 10 is shown operably mounted on a vehicle tire 12, the normal direction of movement of tire 12 being shown by the arrow thereon. It is to be pointed out that tire 12 is of the type ordinarily having a rubber casing 14 with a tread formed therein, casing 14 being mounted on a steel rim 16.

Device 10 has a relatively short shaft 18 upon which is mounted a circular disk 20, disk 20 being rigidly secured to shaft 18 by welding, it being noted that disk 20 is disposed intermediate the ends of shaft 18. Also secured to shaft 18 adjacent face 22 of disk 20 is a toothed ratchet wheel 24, welding also being employed to secure the wheel 24 to the shaft 18.

Also mounted on shaft 18 is a fulcruming element broadly designated 26 and which includes an annulus 28 rotatably mounted on shaft 18 by virtue of a spider which is comprised of a U-shaped band 30 extending across the diameter of band 28 and a band 32 disposed perpendicularly to band 30 and also extending across the diameter of band 28. From Fig. 4 of the drawings it can be seen that the short leg (e.g., leg 34) of the bands 30 and 32 is secured to the innermost face of annulus 28 so that the annulus 28 is located in circumscribing relationship to shaft 18. Also, as is obvious from Fig. 4, band 30 has an opening 35 for clearing shaft 18, the band 30 being located outwardly from ratchet wheel 24, whereas band 32 has an opening 37 for clearing shaft 18 and is disposed adjacent the face 36 of disk 20.

It can be appreciated that the openings 35 and 37 in bands 30 and 32 respectively operate as a bearing upon which annulus 28 and the spider thereof are disposed so that shaft 18 may rotate relative to annulus 28.

Means for holding the annulus 28 and the spider thereof in position relative to shaft 18 may take the form of a clamp broadly designated 38 and which includes a pair of oppositely disposed parts 40 and 42 secured to shaft 18 by virute of bolt and nut means 44.

Also located on band 30 is mechanism for preventing relative rotation of ratchet wheel 24 and which includes a pawl 46 secured to a short pin 48 pivotally mounted in an opening 50 through band 30. A knob 52 is secured to the outermost end of pin 48, and a leaf spring 54 is located on the innermost face of band 30 in a position so as to bias the free end of pawl 46 into contacting engagement with the teeth of ratchet wheel 24.

A plurality of articulated arms broadly designated by the number 56 are secured to the outer periphery of disk 20 and it is to be noted, particularly from Fig. 1, that each of the arms 56 includes a first section 58 and a second section 60 which are joined by a joint broadly designated 62. Also, as shown in Fig. 1, the first sections 58 are rigidly secured to disk 20 in a manner so as to be circumferentially spaced and extending radially from shaft 18. Also of importance is the fact that the first sections 58 do not extend the entire distance between the periphery of disk 20 and the innermost surface of annulus 28 and also, that there is provided an opening 64 for reciprocably receiving a segment of each of the second sections 60.

The second sections 60 are of sufficient length that they extend almost to the periphery of casing 14. Rigidly secured to the outermost end of each of the second sections 60 is a U-shaped tire grip 66 which has a relatively long, flat bight 68 and a pair of legs 70 and 72 substantially perpendicular thereto. As clearly shown in Figs. 1, 2 and 3, leg 72 is substantially L-shaped in cross-section and has an opening therein for receiving the outermost end of second section 60. Preferably, section 60 has a portion of its outermost end threaded so as to receive a first nut 74, whereupon the leg 72 is placed over the outermost end of second section 60 against nut 74 and then rigidly held in position by another set nut 76.

Both the inner and outer faces of each of the bights 68 are scored so as to provide a number of upstanding lugs which serve the function of providing a high degree of frictional contact both between the tread of casing 14 with the inner surface of bight 68 and also so as to provide a high coefficient of friction between the outermost surface of bight 68 and the ground. It can also be appreciated that because of the provision of leg 70 of grip 66, when the bight 68 of grip 66 is brought into tight frictional engagement with the tread of casing 14, leg 70 grips the inner side wall of casing 14 to thereby cause grip 66 to remain in position as tire 12 moves along on a supporting surface.

Joint 62 preferably comprises a U-shaped shackle 78 having a bight 80 and a pair of legs 82 and 84. The bight 80 of shackle 78 is rigidly secured to the outermost end of first section 58, and a cross pin 86 is provided secured to and extending between the legs 82 and 84. Welded to the innermost end of the second section 60 is a spherical head 88 having an opening therein and which is rotatably mounted on pin 86.

From Fig. 4 it can be seen that it is desirable to provide a hexagonal head 90 on the end of shaft 18 adjacent clamp 38 of sufficient size so as to be received in a standard tire nut removing tool.

It can now be seen that device 10 is uniquely adapted to permit the mounting thereof on casing 14 without the necessity of jacking tire 12 off the ground, and this is especially true because of the fact that the sections 60 are spaced a sufficient distance that they bridge the area of casing 14 which is disposed on the ground. Assuming that the arms 56 are disposed in their extended position as shown in phantom in Fig. 1, device 10 is placed against tire 12 with the grips 66 located adjacent the peripheral tread of tire 12 and shaft 18 substantially coincident with the axis of rotation of tire 12 and then the grips 66 are moved inwardly into engagement with the tread of tire 12 by rotation of shaft 18 with the aid of a standard tire tool or the like.

Upon rotation of shaft 18 in a clockwise direction looking at Fig. 1, it can be seen that disk 20 and ratchet wheel 24 are also rotated in the same direction and pawl 46 rides on the teeth of wheel 24 against the action of spring 54. As disk 20 moves in a clockwise direction, the first sections 58 attached thereto also rotate in the designated direction and, because of the fulcruming action of a segment of each of the second sections 60 as they reciprocate in the openings 64 of annulus 28, grips 66 move inwardly into engagement with the tread of tire 12.

In order to remove device 10 from casing 14, it is merely necessary to rotate knob 52 in a clockwise direction looking at Fig. 5, and pawl 46 releases ratchet wheel 24 to thereby permit rotation of shaft 18 in a counterclockwise direction, thus causing grips 66 to move outwardly with respect to the peripheral edge of casing 14.

By virtue of the relatively simple construction of device 10, and the tight engagement which is effected between grips 66 and the tread of casing 14, device 10 is uniquely adapted to withstand the strain occasioned by hard and continuous use on the road, and also the centrifugal force which has prevented most of these devices previously from being commercially practical. This invention has solved all of such previous difficulties and will withstand long use without usual breakdown problems.

Having thus described the invention what is claimed as new and desired to be secured by Letters Patent is:

1. For use on a vehicle wheel, a tire traction device adapted to be mounted on and removed from the tire without raising the wheel off the ground and comprising a central rotatable shaft independent of the tire and wheel; a disc secured to the shaft in coaxial relationship thereto; a plurality of circumferentially spaced, articulated arms each including a first section and a second section, each of said first sections being supported by, attached to and extending radially from the disc, each of said second sections extending outwardly from its respective first section; a tire grip carried by the outermost end of each of the second sections and extending laterally therefrom in one direction away from the major plane of said disc; and a fulcruming element entirely rotatably carried by and surrounding the shaft in circumferentially spaced relationship to the latter and reciprocably receiving a segment of each of the second sections respectively whereby upon rotation of the shaft and thereby the disc in one direction, the grips are moved inwardly toward the axis of said shaft to engage the tire as each of said segments of the second sections are fulcrumed against said element.

2. For use on a vehicle wheel, a tire traction device adapted to be mounted on and removed from the tire without raising the wheel off the ground and comprising a central, rotatable shaft independent of the tire and wheel; a disc secured to the shaft in coaxial relationship thereto; a plurality of spaced, articulated arms supported by, attached to and extending radially outwardly from the disc; a tire grip carried by the outermost end of each of the arms and extending laterally therefrom in one direction away from the major plane of said disc; a fulcruming element entirely rotatably carried by and surrounding the shaft in circumferentially spaced relationship to the latter and reciprocably receiving a segment of each of the arms respectively whereby upon rotation of the shaft and thereby the disc in one direction, the grips are moved inwardly toward the axis of said shaft to engage the tire as each of said segments of the arms are fulcrumed against said element; and means on said element and the shaft for releasably preventing retrograde movement of the shaft in the opposite direction.

3. For use on a vehicle wheel, a tire traction device adapted to be mounted on and removed from the tire without raising the wheel off the ground and comprising a central rotatable shaft independent of the tire and wheel; a disc secured to the shaft in coaxial relationship thereto; a plurality of spaced, articulated arms supported by, attached to and extending radially outwardly from the disc; a tire grip carried by the outermost end of each of the arms and extending laterally therefrom in one direction away from the major plane of said disc; an annular fulcruming element entirely rotatably carried by and surrounding the shaft in circumferentially spaced relationship to the latter and having an opening for each arm respectively, each of said openings reciprocably receiving a segment of each of the arms whereby upon rotation of the shaft and thereby the disc in one direction, the grips are moved inwardly toward the axis of said shaft to engage the tire as said segments of the arms are fulcrumed against said element; ratchet means on said element and the shaft for releasably preventing retrograde movement of the shaft in the opposite direction; and means carried by said element and engageable with said ratchet means for releasing the latter.

4. For use on a vehicle wheel, a tire traction device adapted to be mounted on and removed from the tire without raising the wheel off the ground and comprising a central rotatable shaft independent of the tire and wheel; a disc secured to the shaft in coaxial relationship thereto; a plurality of circumferentially spaced, articulated arms each including a first section and a second section, each of said first sections being supported by, attached to and extending radially from the disc, each of said second sections extending outwardly from its respective first section; a U-shaped tire grip carried by the outermost end of each of the second sections and extending laterally therefrom in one direction away from the major plane of said disc; a bearing on the shaft; a fulcruming annulus; a spider mounting the annulus on the bearing in circumferentially spaced, surrounding relationship thereto, said annulus having an opening for each arm respectively, each of said openings reciprocably receiving a segment of each of the second sections whereby upon rotation of the shaft and thereby the disc in one direction, the grips are moved inwardly to engage the tire as said segments of the second sections are fulcrumed against said annulus; a ratchet wheel secured to the shaft; and spring-loaded pawl means pivotally mounted on the spider in a position to engage the teeth of the ratchet whereby retrograde movement of the shaft is releasably precluded; and means carried by the spider for moving said pawl to release the ratchet.

5. A tire traction device as set forth in claim 4 wherein said shaft has a tire tool receiving head thereon.

6. A tire traction device as set forth in claim 4 wherein the joint between said first and second sections of each of the arms consists of a U-shaped shackle on one of the sections; a cross pin secured to the shackle; and a head on the other section, said head being rotatably mounted on the pin.

References Cited in the file of this patent

UNITED STATES PATENTS

| | | |
|---|---|---|
| 1,120,946 | Lambert | Dec. 15, 1914 |
| 2,517,634 | Daley | Aug. 8, 1950 |
| 2,621,082 | Vuiglio | Dec. 9, 1952 |